Dec. 24, 1968
H. E. SPINDLE
3,418,575
HIGH VOLTAGE CURRENT MEASURING DEVICE EMPLOYING MEANS
RESPONSIVE TO THE ELECTROMAGNETIC FIELD GENERATED
BY THE CURRENT
Filed Feb. 28, 1963
2 Sheets-Sheet 1
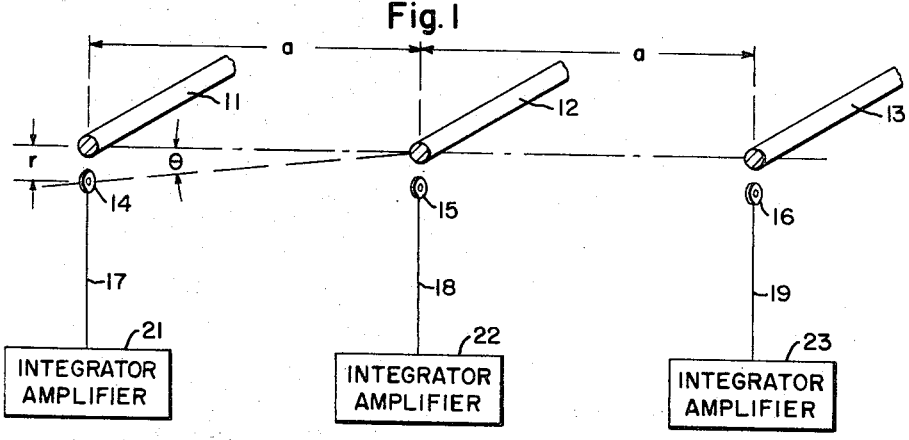
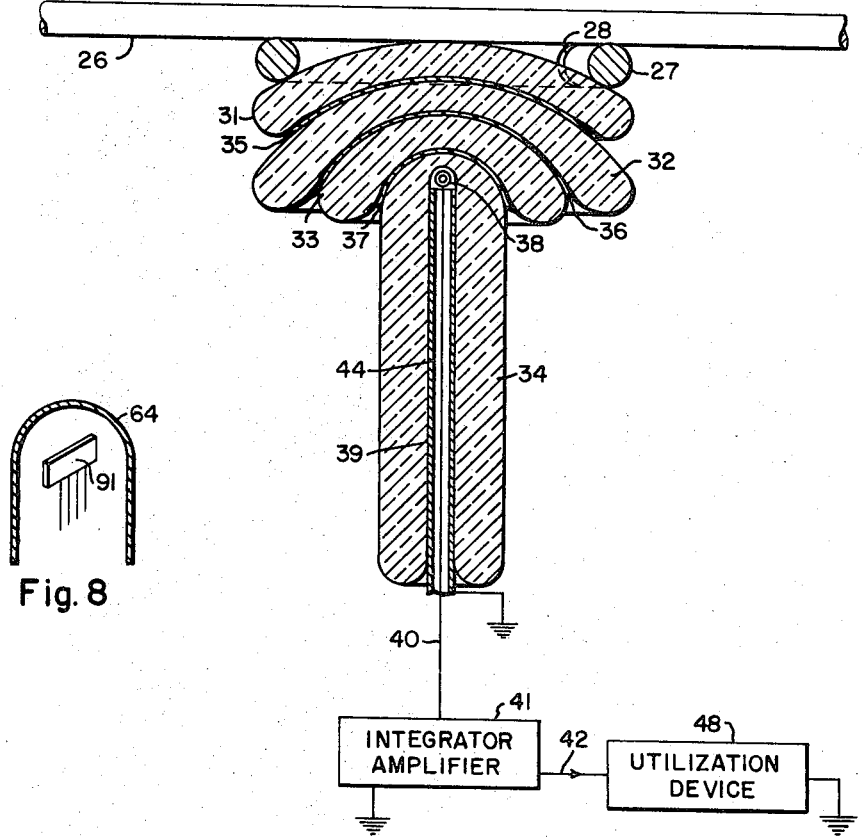
WITNESSES
John F. Chopp
Leon M. Garman
INVENTOR
Harvey E. Spindle
BY Maury I. Hull
ATTORNEY Dec. 24, 1968
H. E. SPINDLE
3,418,575
HIGH VOLTAGE CURRENT MEASURING DEVICE EMPLOYING MEANS
RESPONSIVE TO THE ELECTROMAGNETIC FIELD GENERATED
BY THE CURRENT
Filed Feb. 28, 1963
2 Sheets-Sheet 2
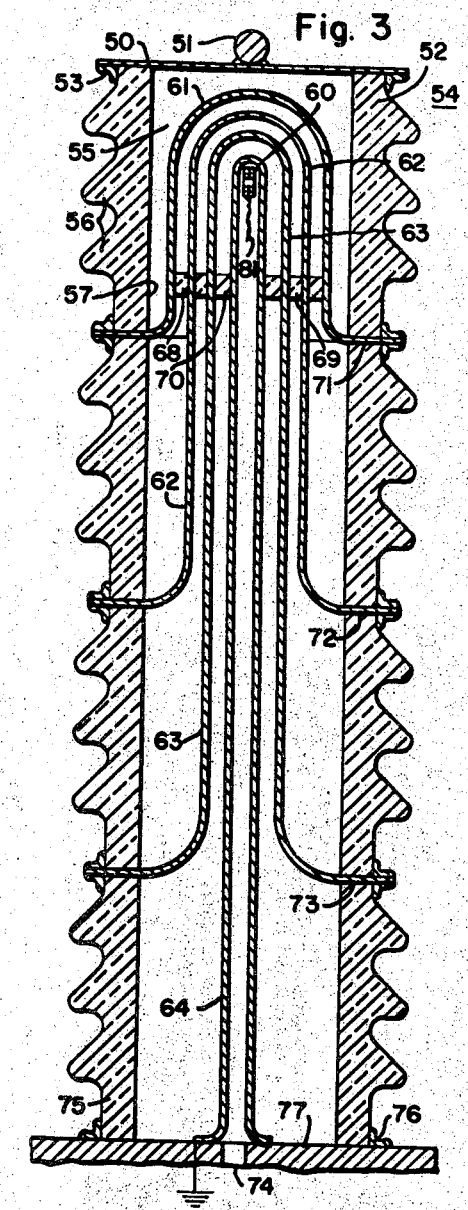
Fig. 3
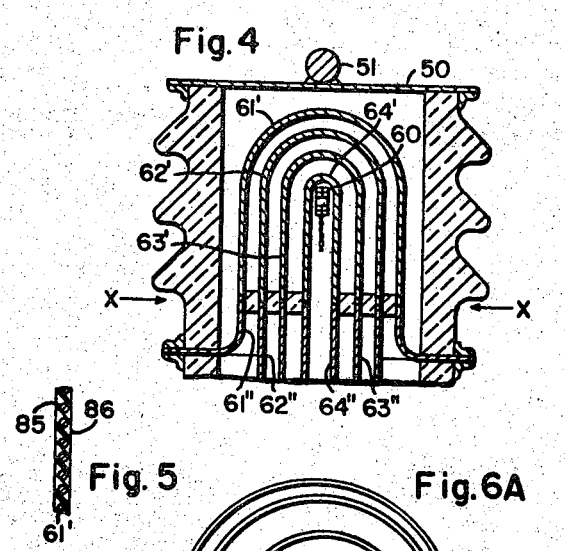
Fig. 4
Fig. 5
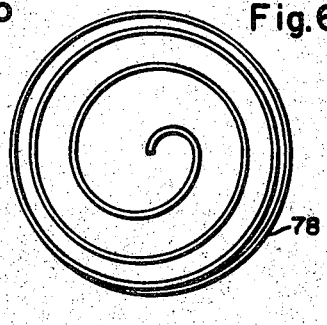
Fig. 6A
Fig. 6B
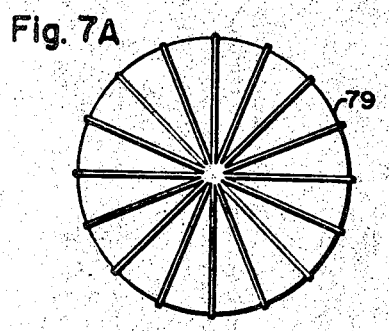
Fig. 7A
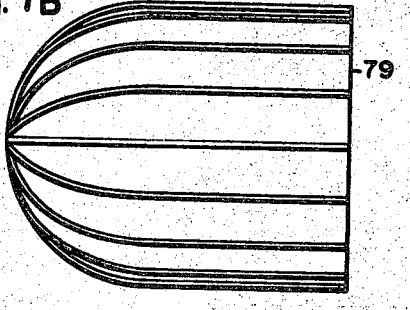
Fig. 7B

United States Patent Office 3,418,575
Patented Dec. 24, 1968

3,418,575
HIGH VOLTAGE CURRENT MEASURING DEVICE EMPLOYING MEANS RESPONSIVE TO THE ELECTROMAGNETIC FIELD GENERATED BY THE CURRENT
Harvey E. Spindle, Wilkins Township, Allegheny County, Pa., assignor to Westinghouse Electric Corporation, Pittsburgh, Pa., a corporation of Pennsylvania
Filed Feb. 28, 1963, Ser. No. 261,788
17 Claims. (Cl. 324—117)

This invention relates to improvements in devices for measuring the current in high voltage transmission lines, and more particularly to an improved device for measuring the current in a line conductor by induction, utilizing the magnetic field set up by the current in the conductor.

It has been known in the art for some time that magnetic pick-up coils and Hall generators could be used to measure the current in conductors of a high voltage transmission line by employing the effect of induction, or pick up of the magnetic field due to the current in the line. One such coil device is shown and briefly described in "Electrical World," Aug. 22, 1960, p. 92. Generally speaking, prior art apparatus has been beset with the difficulty of confining the signal induced in any pick-up device to that caused by the field of a particular conductor of the transmission line system. That is, the magnetic fields of other conductors of a multiphase line, other than the conductor in which it was desired to measure the current, have also induced currents in the pick-up coil making measurement difficult and inaccurate.

The apparatus of the instant invention overcomes the disadvantages of the prior art by use of an insulating and electric field distributing structure which allows the pick-up device to be positioned as close as possible to the conductor and thus achieve maximum coupling to the desired conductor and minimum coupling to other current carrying conductors.

In summary, the apparatus includes a pick-up coil or Hall effect device mounted inside an insulating structure, the insulating structure including one or more spaced Faraday shields between the pick-up coil and the conductor which serve to distribute the potential field over large areas while still permitting the electromagnetic field of the chosen conductor to induce a signal in the coil. Where the insulator structure consists of a series of stacked insulating inverted bowl-shaped spacers or dishes, the use of a non-magnetic Faraday shield preferably of semiconductor material between each adjacent pair of dishes provides equipotential planes to give efficient use of the insulation (that is, provide that the potential field has a uniform gradient, and avoid any point of high gradient), increases the breakdown potential, and permit the pick-up coil to be much closer to the desired conductor, reducing the relative strength of stray magnetic fields at the coil from other conductors.

In one embodiment of the apparatus, Faraday shields also serve to evenly distribute potential on the outside of the insulator to obtain maximum flashover, and also an insulator arrangement is provided to ensure a long outside creepage path to prevent creepage breakdown.

Accordingly, a primary object of the invention is to provide new and improved high voltage monitoring and current measuring apparatus.

Another object is to provide new and improved current measuring apparatus employing a magnetic pick-up coil for use with a high voltage transmission line.

A further object is to provide a new and improved current measuring device for a high voltage transmission line employing a Hall generator positioned within the magnetic field of the conductor.

A further object is to provide a new and improved high voltage current measuring device in which the efficiency and accuracy of the device are improved by means permitting pick-up coils to be positioned closely adjacent to the conductors from which the coils are to pick up magnetic fields and by which fields desired signals are to be induced therein, thereby reducing or substantially eliminating the effects of stray pick-up from other conductors of the transmission line system. These and other advantages will become more clearly apparent after a study of the following specification, when read in connection with the accompanying drawings, in which:

FIGURE 1 illustrates prior art use of pick-up coils to measure currents in the conductors of a three phase line;
FIG. 2 illustrates the invention according to one embodiment thereof;
FIG. 3 is a view in cross section of the invention according to the preferred embodiment thereof;
FIG. 4 is a view of apparatus embodying the invention according to an additional embodiment thereof;
FIG. 5 is a fragmentary detailed view of the Faraday shield structure of FIG. 4;
FIGS. 6A, 6B, 7A and 7B are drawings illustrating additional Faraday shield embodiments used in the invention; and
FIG. 8 is a fragmentary view, showing a Hall generator as the pick-up device.

Referring now to the drawings, in which like reference numerals are used throughout to designate like parts, for a more detailed understanding of the invention, and in particular to FIG. 1 thereof showing a prior art arrangement, there are shown at 11, 12 and 13 three conductors of a high voltage transmission line having disposed in spaced relation thereto at substantially equal spaced intervals three pick-up coils 14, 15 and 16, connected by two-conductor cables 17, 18 and 19 to integrator amplifiers 21, 22 and 23 which it will be understood supply signals to indicating devices, not shown, for indicating the value of the current in the conductor.

It will be noted in connection with the apparatus of FIG. 1 that the coils are so arranged that the electromagnetic lines of flux caused by current in the conductors cut the coils in a manner to induce maximum signals therein. Generally speaking however, the coils must be disposed a distance from the conductors which is substantially equal to the spacing between the conductors themselves, that is $r \cong a$, since in order to protect users of the apparatus the coils must be maintained at or close to ground potential. Accordingly, a coil, for example coil 14 of the conductor 11 has a signal induced therein by electromagnetic coupling not only to the conductor 11 but also to the conductors 12 and 13, and the component of the signal induced in coil 14 by electromagnetic coupling, especially to conductor 12, represents an undesired component which impairs the accuracy of the device. The desired signal is proportional to $1/r$. The undesired signal is proportional to $$\frac{\sin \theta}{\sqrt{r^2 + a^2}}$$

Instead of coils 14, 15 and 16, the prior art may use Hall effect devices, in which signals are induced as a result of a strip of metal being placed with its plane perpendicular to the lines of force of a magnetic field, and when an electric current flows longitudinally through the strip while a magnetic field of predetermined direction impinges thereon a potential difference is developed between its two opposite lateral edges, this potential difference being used as a measure of the strength of the magnetic field, and hence as a measure of the current flowing in the adjacent conductor.

Particular reference is made now to FIG. 2 in which one embodiment of the apparatus of the invention is shown. The high voltage conductor 26 is shown secured to a supporting member which may be a ring 27 of conductive material, but composed of a non-magnetic material such as copper or aluminum, and having a gap at some point 28 therein, so as not to interfere with the magnetic field of the conductor, for reasons which will become more clearly apparent hereinafter. At 31, 32, 33 and 34 are shown four inverted bowl-shaped spaces or dishes having smooth concave and convex surfaces, which may be composed of porcelain, and which are interconnected by, and may be bound together by semiconducting joints at 35, 36 and 37. The semiconductor joints 35, 36 and 37, which may be silicon carbide or a material known in the trade as "Aquadag," do not interfere with the passage of the magnetic lines of force from conductor 26 to a pickup coil 38 disposed in an aperture 39 in the aforementioned porcelain dish 34. It will be understood that the aperture 39 may be formed in the member 34 when the member 34 is cast or poured, or it may be a machined bore. The semiconductor joints provide the effect of Faraday shields, and also since they are conductive they distribute the potential field evenly over a wide area of the dish, that is, they provide that the potential field has a uniform gradient, and thereby provide for efficient use of the solid insulation; they also equalize the potential distribution or potential field on the peripheries of the various dishes to obtain maximum flashover. It will be noted that the dishes extend considerably beyond the semiconductor joints to provide a long outside creepage path to prevent creepage breakdown.

The aforementioned pickup device 38, which may be a coil, is disposed in a predetermined position whereby the lines of magnetic force from conductor 26 pass therethrough and induce a signal therein. The pickup coil 38 is connected by two conductor cable 40 to an integrating amplifier 41 which may be of conventional design and which provides an output at 42 proportional to the current in the conductor 26 for use at 48. Utilization device 48 may include a meter calibrated in current values of the current in line 26. An indication of phase may also be given if desired. If desired, the arrangement shown may be employed to provide maximum protection for the coil by having a conductive non-magnetic coating 44 on the inside of the chamber 39, and which is maintained at ground potential. Instead of conductive coating 44, a metallic sleeve of non-magnetic material may be employed.

Pick up device 38 may be a rectangular-shaped Hall generator positioned so that the magnetic lines of flux from conductor 26 arrive thereat in the required direction with respect to the dimensions and geometry of the Hall generator, in which case conductor means 40 will include in addition means for applying a direct current potential to the Hall generator, and device 41 will include the source of such potential. Where the Hall generator is employed, no integration is required at 41.

Particular reference is made now to FIG. 3, in which apparatus is shown according to the preferred embodiment of the invention. In FIG. 3, the high voltage conductor 51 is suitably attached to a circular shield of conductive non-magnetic material 50 attached to the head portion 52 of an insulator, the shield 50 being secured to the head portion 52 by a retaining ring 53, the insulating column being composed of porcelain, plastic or other suitable material, the column being generally designated 54, having an inner wall 57 and a plurality of spaced skirts 56 on the outside thereof. The invention contemplates that the inner portion 55 of the column 54 may be filled with oil, or a suitable insulating gas, or may be a vacuum, and that the pickup coil 60 is electrostatically shielded from the conductor 51 by a plurality of conductive but non-magnetic shields, one of these shields being aforementioned shield 50 having a contour to fit the head portion 52, the other shields being designated 61, 62 and 63, shield 61 being supported at joint 71 in the column, shield 62 at joint 72, and shield 63 being supported at joint 73. It should be noted that the pickup coil 60 is disposed with the plane of the coil passing through the conductor 51, and the axis of the coil is perpendicular to the direction of the conductor 51. This insures that the signal induced in the coil 60 by magnetic lines of force caused by the current in conductor 51 will be a maximum. The coil 60 is disposed in a grounded support and shield member 64 which it is understood is composed of non-magnetic material, as are the shields 61, 62 and 63, to provide electrostatic shielding while permitting the magnetic lines of force from the conductor 51 to reach the coil 60. It is further understood that a two conductor lead 81 passes through the hollow member 64 to the pickup coil 60. The various shields 61, 62, 63 and 64 are spaced from each other by spacers 68, 69 and 70 which may if desired be disposed near and below the coil, as shown. Preferably the spacing between shields 61–62, 62–63 and 63–64 is uniform over their entire areas above the spacer members. The lower end 75 of the porcelain column 54 is secured by ring member 76 to a supporting structure 77 which it is understood may be part of a conventional cable tower or other convenient supporting means. Aperture 74 is provided for the passage of leads 81.

Particular reference is made now to FIGS. 6A and 6B, and 7A and 7B. It is contemplated that if desired the shields 61, 62, 63, etc. be made of a conductive material which is non-magnetic, or if desired that these shield members be made of a non-conducting plastic and that they be coated or covered with wire Faraday screen inserts or printed conductor screens which may have the configurations shown in FIGS. 6A–6B, or 7A–7B. FIG. 6A is a plan view of the screen shown in FIG. 6B in side elevation, whereas FIG. 7A represents a plan view of the screen shown in side elevation in FIG. 7B, the screen of FIG. 7 being one usually referred to as the umbrella type, and the screen of FIG. 6 being of a spiral type. These screens of FIGS. 6 and 7 have the advantage that they may be printed on plastic members, and also that it is unnecessary for a connection to cross any of the printed portion of the circuit.

Particular reference is made now to FIG. 4, which shows an additional embodiment similar to the embodiment of FIG. 3. In FIG. 4, the conductor 51 is attached to the Faraday shield member 50' composed of a non-magnetic material. It is seen that the shields 61', 62', 63' and 64' are composed of metallic portions 61", 62", 63" and 64" which extend up to substantially the plane $x$—$x$, and that the portions of the shields above this plane or between this plane and the conductor 51 are electrostatic shields of the Faraday type, composed of non-magnetic material, either coated, printed or otherwise provided, to permit the passage of the magnetic lines of force from the conductor 51 through the pickup coil 60.

Particular attention is directed to FIG. 5, showing an enlarged view of Faraday Screen 61' according to one structure, consisting of a wire mesh 85 in a non-conductive plastic support 86.

The screens of FIGS. 6 and 7 may be used in the embodiment of FIG. 4.

Coil 60 in the embodiments of FIGS. 3 and 4 may be replaced by a Hall generator 91 as in FIG. 8, a source of direct current potential being provided, with additional lead means between the source of potential and the Hall generator.

There has been provided, then, apparatus well suited to accomplish the objectives of the invention, which are to permit the mounting of a pickup coil or other pickup device in close proximity to a high voltage conductor, to utilize Faraday shields to distribute the potential and provide a potential field which has a uniform gradient to give efficient use of solid or fluid insulation, to provide a maximum flashover, and to provide a long creepage path.

It will be readily understood that in all embodiments preferably the spacing between shields is uniform over their areas to provide potential fields of uniform gradient and avoid points of high gradient or great potential stress.

Any suitable bonding material may be employed in any of the embodiments where needed or desired.

Whereas the invention has been shown and described with respect to some embodiments thereof which give satisfactory results, it should be understood that changes may be made and equivalents substituted without departing from the spirit and scope of the invention.

I claim as my invention:

1. High voltage current measuring apparatus comprising, in combination, an insulator structure adapted to be secured to a high voltage line, and a pickup device mounted in the insulator structure in position for having a signal induced therein by magnetic lines of force caused by current flowing in the line, the insulator structure being composed of a plurality of discrete layers of insulating material and a plurality of semiconductive joints securing the layers of insulating material together, the layers of insulating material being smooth on both sides thereof, said semiconductive joints serving as electrostatic shields while permitting the passage of the magnetic lines of force therethrough, said semiconductive joints providing a potential field which has a substantially uniform gradient to provide efficient use of the insulation, said semiconductive joints substantially evenly distributing the potential stress around the periphery of the joints and over the outsides of the insulator layers thereby to provide maximum flashover.

2. A current measuring device for a high voltage conductor comprising, in combination, a plurality of inverted bowl-shaped spacers composed of insulating material disposed in stacked substantially axially aligned relationship to each other, said spacers having smooth concave and convex surfaces, a semiconductive joint between adjacent spacers of said plurality of spacers and binding the adjacent spacers together, means on one extremity of the spacers for mounting the spacers on the high voltage conductor, said last named means being composed of a material which permits the free passage of magnetic lines of force therethrough, a pickup device disposed near the other extremity of the plurality of spacers, and lead means connected to the pickup device, the pickup device having induced therein a signal proportional in amplitude to the strength of the magnetic field from the conductor and accordingly proportional to the current flowing in the conductor.

3. Apparatus for measuring the current in a high voltage conductor comprising, in combination, an inductor disposed in a predetermined position with respect to said conductor and having a signal induced therein by magnetic flux caused by current flowing in the conductor, said signal varying in amplitude in accordance with variations in said current, and insulator means disposed between the inductor and the conductor and mounting said inductor near said conductor within the electromagnetic field generated by current flowing in the conductor, said insulator means including a plurality of smooth-surfaced insulating sections having interposed between sections joints of conductive material, said conductive material being non-magnetic and offering substantially free passage of the magnetic flux from the conductor, said joints of conductive material distributing the electrostatic field of the conductor voltage over large surface areas of the insulating sections and providing that the potential field has a uniform gradient.

4. Apparatus for measuring the current in a high voltage conductor comprising, in combination, an inductor disposed within the magnetic field generated by current in said conductor and having a signal induced therein by magnetic flux caused by current flowing in the conductor, said signal varying in amplitude in accordance with variations in said current, and insulator means mounting said inductor in spaced relation to said conductor, said insulator means being disposed between the inductor and the conductor and including a plurality of alternate smooth-surfaced insulating sections and conductive sections, said plurality of insulating sections and plurality of conductive sections being bonded together, said conductive sections being composed of non-magnetic material and offering substantially free passage to the magnetic flux from the conductors, said conductive sections distributing the electrostatic field of the conductor voltage over large areas of the insulating sections and providing that the potential field has a uniform gradient.

5. In apparatus for measuring the current in a high voltage conductor, in combination, a cylindrical insulating member, electrostatic shield means composed of non-magnetic material secured to one end of said cylindrical insulating member and having the conductor secured thereto, a plurality of electrostatic shield members composed of non-magnetic material, each of said shield members being generally cylindrical in shape with flaring annular lip portions at the lower open ends thereof, said shield members being of different diameters, said shield members being concentrically mounted with respect to each other, all of said shield members being mounted in positions uniformly spaced from each other within the insulating member, the ends of said shield members adjacent said conductor being closed and semispherical in shape while maintaining the spacing between shield members uniform, and a pickup device mounted in the shield member of smallest diameter in a position with respect to said conductor whereby a signal is induced therein by magnetic flux caused by current flowing in the conductor, said signal varying in amplitude in accordance with variations in said current.

6. In apparatus for measuring the current in a high voltage conductor, in combination, a hollow insulating member, a flat disc-like fastening member for fastening one end of said insulating member to said conductor, said fastening member covering substantially the entire adjacent end of the insulating member and being composed of a non-magnetic conductive material, a pickup device disposed in predetermined position in the insulating member, said pickup device having a signal induced therein by magnetic flux caused by current flowing in the conductor, said signal varying in amplitude in accordance with variations in said current, and a plurality of electrostatic shields composed of non-magnetic conductive material disposed in said insulating member at spaced intervals between said pickup device and the fastening member, the distance between adjacent shields being substantially uniform over substantially the entire areas of the shields in the region of the potential field between the conductor and the pickup device, said shields having flared open ends providing a potential field of uniform gradient to maximize the voltage breakdown potential of the insulating member between the conductor and the pickup device and at the same time permit free passage of the magnetic flux to said pickup device.

7. Apparatus according to claim 6 in which the insulating member is additionally characterized as being closed at both ends to form a sealed chamber, and including in addition a fluid insulating material disposed in said insulating member and filling the spaces between the shields.

8. Apparatus for measuring the current in a high voltage conductor comprising, in combination, a cylindroid insulating member, means secured to one end of said member for attaching the member to the high voltage conductor, conductive means secured to the other end of the insulating member and adapted to be maintained at ground potential, a pickup device disposed in the insulating member and having a signal induced therein by magnetic flux caused by current flowing in the high voltage conductor, the signal varying in amplitude in accordance with variations in said current, and electrostatic shield means disposed on said insulating member, said shield means providing a potential field which has a substantially uniform gradient between the conductor and the pickup device.

9. Apparatus according to claim 8 wherein the shield means is additionally characterized as consisting of printed circuits printed on the insulating member.

10. Apparatus according to claim 8 wherein the shield means consists of printed conductors in spiral form printed upon the insulating member.

11. Apparatus according to claim 8 wherein the shield means consists of printed conductors in the form of an umbrella printed upon the insulating member.

12. Apparatus according to claim 6 in which the inside of the insulating member and the spaces between the electrostatic shields are evacuated to a high degree.

13. Apparatus according to claim 11 including in addition amplifier and monitor means electrically connected to the pickup device for providing an indication of the current flowing in the conductor.

14. In apparatus for monitoring the current in a high voltage conductor, in combination, inductor means for generating an electrical signal from magnetic lines of flux of a predetermined direction, and insulator means for mounting the inductor means in predetermined position with respect to said high voltage conductor whereby lines of magnetic flux circling said conductor while current flows therein cut the inductor means from said predetermined direction, said insulator means including a plurality of spaced Faraday shields interposed between the conductor and the inductor means, each Faraday shield distributing the potential field between itself and an adjacent shield over a wide area, the Faraday shields providing that the potential field has a uniform gradient and maximizing the breakdown potential of the insulator means.

15. Apparatus according to claim 14, including in addition means for maintaining the Faraday shield nearest the signal generating means at ground potential.

16. Apparatus according to claim 14 wherein the signal generating means is a Hall effect device.

17. High voltage current measuring apparatus comprising, in combination, an insulator structure adapted to be secured to a high voltage line, the insulator structure including alternate layers of conductor material and insulator material and being constructed and arranged whereby no large electrostatic field gradient exists in the insulator structure, a device mounted on the insulator structure in predetermined position, the device having a signal induced therein by the current flowing in the line, and utilization means connected to the device for utilizing the signal.

References Cited

UNITED STATES PATENTS

| | | | |
|---|---|---|---|
| 1,728,522 | 9/1929 | Baum | 174—140 X |
| 2,275,208 | 3/1942 | Taylor | 174—140 |
| 3,055,968 | 9/1962 | Spiece | 174—143 X |
| 3,187,282 | 6/1965 | Pierce et al. | 174—143 X |
| 3,219,930 | 11/1965 | Sipler | 324—117 |

RUDOLPH V. ROLINEC, *Primary Examiner.*

E. F. KARLSEN, *Assistant Examiner.*

U.S. Cl. X.R.

324—72.5, 127; 336—70, 84